United States Patent [19]

Perkonigg et al.

[11] Patent Number: 5,274,978
[45] Date of Patent: Jan. 4, 1994

[54] CLAMP FOR FASTENING PLATE-FORM BODIES TO A FLAT SUPPORT PLATE

[75] Inventors: Erwin Perkonigg, Munich; Manfred Riermeier, Oberneuching, both of Fed. Rep. of Germany

[73] Assignee: Siemens Solar GmbH, Munich, Fed. Rep. of Germany

[21] Appl. No.: 940,989

[22] Filed: Sep. 4, 1992

[30] Foreign Application Priority Data

Sep. 11, 1991 [DE] Fed. Rep. of Germany ....... 4130214

[51] Int. Cl.⁵ .......................... E04D 1/34; E04B 1/38; B25B 1/24
[52] U.S. Cl. ........................................ 52/547; 52/509; 29/243.56; 29/281.5; 269/40; 269/904
[58] Field of Search ................... 29/451, 243.5, 243.56, 29/DIG. 47, 281.5; 24/294, 295; 52/509, 520, 521, 543, 547; 269/40, 904

[56] References Cited

U.S. PATENT DOCUMENTS

| | | | |
|---|---|---|---|
| 1,124,093 | 1/1915 | Woodruff | 52/547 |
| 2,317,428 | 4/1943 | Anderson | 52/509 |
| 2,490,663 | 7/1945 | Van Uum et al. | 52/509 |
| 4,053,972 | 10/1977 | Kordes | 29/451 |

FOREIGN PATENT DOCUMENTS 2613445 10/1977 Fed. Rep. of Germany .
733027 7/1955 United Kingdom .

Primary Examiner—Timothy V. Eley
Assistant Examiner—Khan V. Nguyen
Attorney, Agent, or Firm—Hill, Steadman & Simpson

[57] ABSTRACT

A clamp for fastening plate-form bodies, such as solar panels, onto a support plate comprises two U-shaped portions opening in opposite directions with a common shank portion of the two U-shaped portions. The body, such as the solar panel, has its edge received in one of the U-shaped portions, such as the upper U-shaped portion, while the opposite edge is received in a lower U-shaped portion of an adjacent row of clamps. Preferably, an elastic part having a U-shaped and profiled surfaces is placed between each of the U-shaped portions and edges of the bodies to prevent damage to the plate-shaped bodies.

4 Claims, 2 Drawing Sheets

CLAMP FOR FASTENING PLATE-FORM BODIES TO A FLAT SUPPORT PLATE

BACKGROUND OF THE INVENTION

The present invention is directed to a clamp for fastening plate-form bodies to a support plate, an assembly using the clamp, as well as to a process for fastening the flat plate-form bodies to a support plate with the aid of the clamp.

For the fastening of flat plate-form bodies, depending on the material of the bodies, many kinds of possibilities offer themselves. Wooden materials and similar materials permit direct fastening by means of screws or nails or also with the aid of special fastening elements. However, brittle materials, such as glass or ceramics, are preferably glued or fastened with the aid of clamps to walls and the like.

SUMMARY OF THE INVENTION

The present invention is directed to providing a clamp for plate-form bodies of, in particular, brittle and sensitive material, which clamp will permit a simple, rapid, firm and simultaneously reversible fastening of several bodies in an overlapping arrangement next to one another.

To accomplish these goals, the present invention is directed to a clamp for fastening plate-form bodies to a flat support plate, said clamp comprising a base plate and two U-shaped profiles, the two U-shaped profiles being disposed one over the other, having a common shank and opening toward opposite sides and having shanks approximately parallel to the base plate, and the base plate has at least one bore for fastening the clamp to a support plate.

The clamp according to the invention presents two profiles opening toward two opposite sides into which the body is inserted during assembly. Since the two profiles lie one over the other and have a middle shank in common, a complete insertion of the edges of the bodies into each of the U-shaped profiles provides an overlapping of the bodies along their edges.

In an advantageous form of execution of the invention, the two profiles have the same height h as measured between the two shanks and the same depth t when measured along the top shank. Thus, it is assured that the overlapping of the body being inserted in the upper and lower profiles, because of the common shank and because of an equal insertion depth in each profile. Thus, there is a possibility of a uniformly overlapping arrangement of several bodies next to one another.

Another functional part besides the clamp is the base plate. This can be present at the same level with the lowest shank and represent an extension of the lower shank. In addition, however, it is also possible for the base plate to be arranged at a certain distance from the lower profile. There becomes a possibility of fastening the body at a corresponding distance from the support plate. This interspace can bring about a necessary rear ventilation between the bodies and support plates, or it can quite simply make ready the necessary free space for bending of the bodies if a contact is to be avoided with the support plate.

Preferably, the clamp consists of metal, for example steel or aluminum. It can be produced as an endless profile, in which case individual clamps can be obtained by sawing-off or other severing of pieces of a desired length from the endless profile.

It is, of course, also possible to manufacture each clamp individually, for example, by bending corresponding steel plates. In this case, for reasons of manufacturing technique, it is especially advantageous to bend off the lowest shank of the double U-shaped profile once again in a U-shaped portion and finally let it run into the base plate. Thus, the clamps can be generated in a simple manner by pressing a steel plate against a corresponding form by means of a stamp.

Height and depth of the U-shaped profiles are governed according to the bodies to be fastened. In a similar manner, there are dimensioned the length of the clamps according to the required strength of the assembled arrangement and according to the weight of the bodies to be fastened. It is, however, also possible to use, instead of one relatively long clamp, several short clamps for the fastening of a body. The fastening of the clamp to the support plate occurs by a suitable fastening means through the bore in the base plate and can be performed by using threaded fasteners, nails or the like.

With the aid of a clamp, it is possible to fasten the bodies to a support plate in an arrangement overlapping in the manner of shingles. As a further possibility, the bodies can be fastened alternately in the clamps. Thus, a body is held on the same plane on oppositely lying edges by the clamps, for example in the lower profile in each case. On both sides in each case, a further body is inserted into a still free upper U-shaped profile of the clamps, while the next but one body can again be held with the aid of the lower U-shaped profiles.

The shingle-form arrangement can be of advantage, especially in the outer zone on support plates inclined to the horizontal. Because in the manner of roof tiles, the upper edge of the body is overlapped by the lower edge of the body lying thereabove and the upper edge is thereby protected.

A process likewise according to the present invention for fastening of flat plate-form bodies to a support plate presents the following steps:

(a) Fastening a clamp with double U-shaped profile to the support plate at one end of a path provided for the assembling in such a manner that the upper profile opens in the assembly direction;

(b) Sliding the edge of the body into the upper profile of the clamp;

(c) Sliding the oppositely lying edges of the first body into the lower profile of the additional clamps;

(d) Fastening the additional clamps to the support plate; and (e) Reproducing the various process steps (b), (c) and (d) with further bodies and clamps, until the web is completely covered in a shingle-form with bodies.

In an especially advantageous manner with the process and clamps, frameless solar modules can be fastened to vertical support plates and to be both inclined and open.

In the case of brittle and inelastic materials of the bodies, especially in the case of frameless solar modules, these can be fixed in position with the aid of additional means in the U-shaped profile. Preferably for this, an elastic part is clamped in between edges and the profile, for which purpose there is used, in particular, a rubber band lying on the inner circumference of a U shape. For an easy insertion and simultaneously better fixing of the body in the clamp, this elastic part, in particular the rubber band, has on its surface a profile which opposes the sliding-in of the edges of the bodies into the clamp with a low resistance, but has a high resistance to removal of the body.

Other advantages and features of the invention will be readily apparent from the following description of the preferred embodiments, the drawings and claims.

DESCRIPTION OF THE PREFERRED EMBODIMENTS

Figure 1:
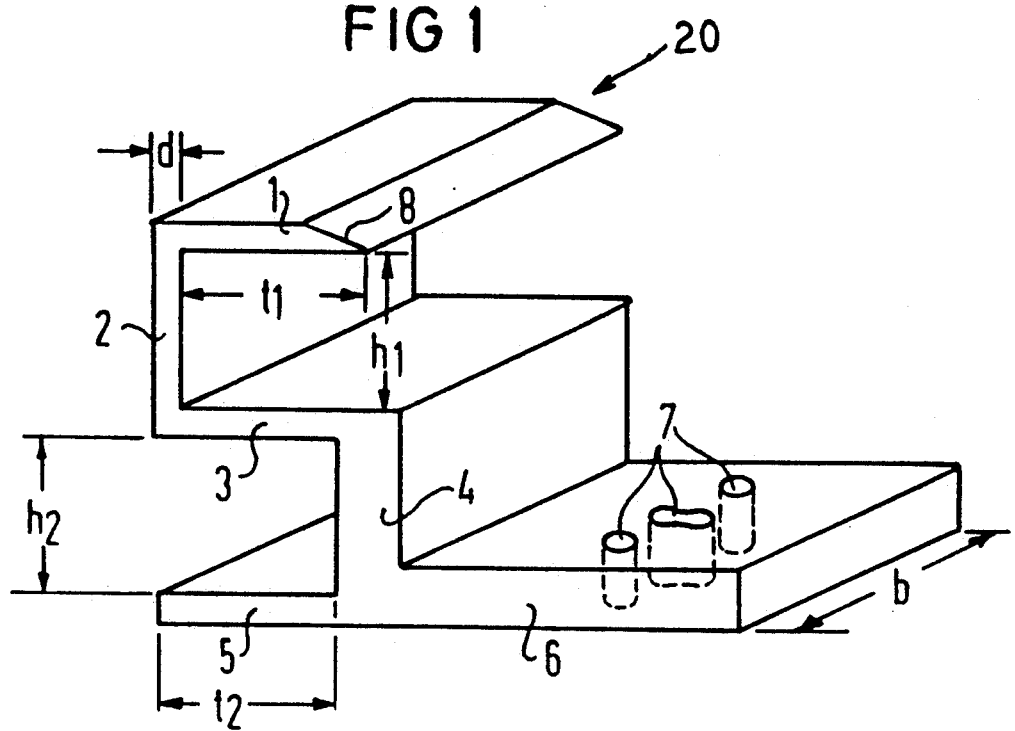
FIG. 1 is a schematic perspective view of a clamp in accordance with the present invention.

The principles of the present invention are particularly useful in a clamp, generally indicated at 20 in FIG. 1, which is an extruded aluminum element and which is attuned in its measurements to the fastening of frameless solar modules. The solar modules, for example, have a size of 1,000×500 mm and consist, in the edge zone, of a glass plate, which has a thickness of approximately 4 mm and is used as a substrate.

Each of the clamps 20 has an upper shank 1, a middle shank 3 and a lower shank 5, which form a double U-shaped profile and which shanks lie in planes parallel to one another. The shanks 1 and 3 are interconnected by a bight or bend portion 2, while the shanks 3 and 5 are interconnected by a bight portion 4 which, as illustrated, extend at substantially right angles, or can form circular arcs with the various shanks. In the latter case, an S-shaped profile is formed from the double U-shaped profile. It is especially advantageous that the shaping out of the clamp is adapted to the edge form of the body to be fastened and it is represented rectangular with at least the inside-lying corners being slightly rounded.

An important characteristic dimension of the clamps is, however, the clear spacing between the two shanks with a spacing h, as well as their depth t measured on, in each case, the upper shank of the profile. In the present case, both the depths t1 and t2, as well as the shank spacings h1 and h2 are identical for both profiles. The height h is attuned to the thickness of the body which, in this case, is a solar module, with the depth t determining the insertion depth of the body into the clamp.

For the fastening of the clamp to a support plate, in the present case, three bores 7 are provided in a base plate 6 of the clamp, with the middle bore having an oblong cross section in order to make possible alignment of the clamps during the fastening. To improve the stability of the base plate 6 and the part or bight 4 can be reinforced with respect to the thickness d of the other parts. While the dimensions of the clamp can be varied arbitrarily in the scope of the invention for arbitrary use and are not essential to the invention, an example of the desired dimensions are as follows: h=8 mm; t=12 mm; d=2 mm and width b=50 mm.

Figure 2:
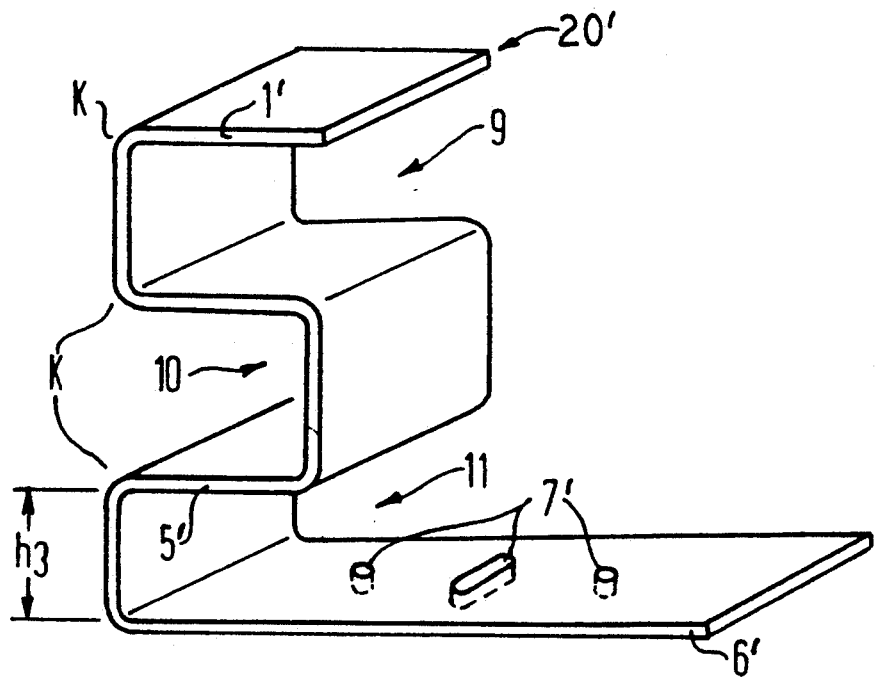
FIG. 2 is a schematic perspective view of a modification of the clamp in accordance with the present invention.

A modification of the clamp is generally indicated at 20' in FIG. 2. The clamp 20' is essentially bent out of a steel sheet. An essential distinction with respect to the first execution is that the clamp 20', in addition to an upper profile 9 and a lower profile 10, provides an additional U-shaped bend or portion 11 before a lower shank 5' runs out into a base plate 6'. For reasons of manufacturing, the clamp has elsewhere a constant wall thickness d of about 1.5 mm, as well as rounded corners K. The other dimensions t, h and d can be chosen and correspond to the first example of FIG. 1. A clear distance h3 of the lower shank 5' from the base plate 6' determines, with consideration of the profile thickness d, the distance of the lower profile above the support plate.

Figure 3:
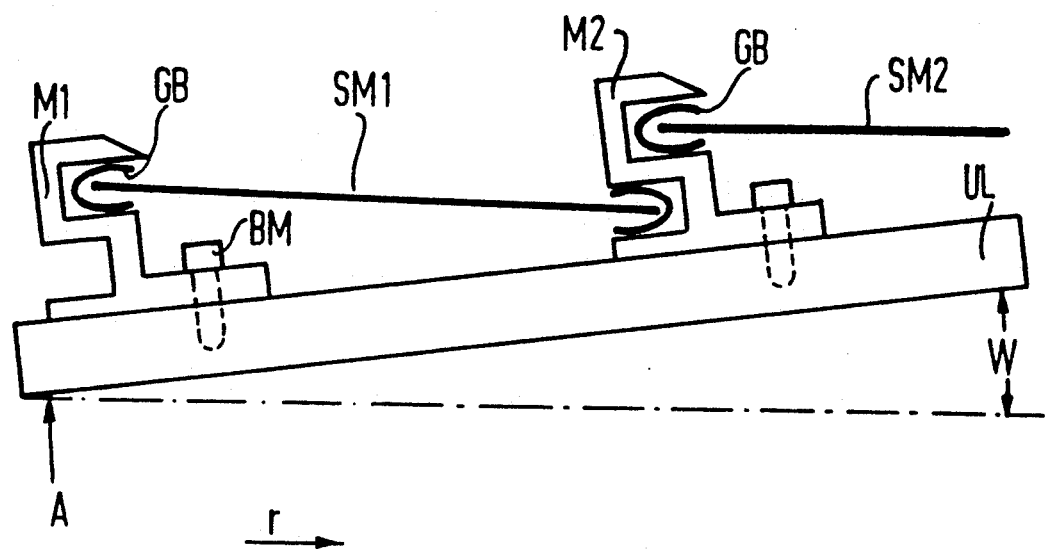
FIG. 3 is an end view showing assembling possibilities of solar modules with the aid of the clamps in accordance with the present invention.

Several solar modules SM1 and SM2 can be fashioned in the shingle-type arrangement on a support plate UL, as illustrated in FIG. 3, utilizing the clamps. This arrangement is advantageous, especially when the support plate UL is inclined with respect to a horizontal plane and forms an angle W therewith. At a lower end A of the support plate UL, there is fastened a first clamp M1 with the aid of fastening means BM, such as by a threaded fastner, to the support plate UL. Into the upper profile of the clamp M1, which points in the assembling direction indicated by arrow r, there is now inserted the edge of a first solar module SM1. An elastic part GB is laid around the edges to provide both for the fixing of the solar module in the clamp and also for a gentle bearing and grasping of the otherwise breakage-endangered solar module. The rubber band or elastic part GB advantageously closes off snugly with the upper shank of the profile. In a like manner, now, the opposite lying edge of the first solar module SM1 is inserted in the lower profile of a second clamp M2, and this is fastened in a like manner to the support plate UL. Because of the not-true-to-measure schematic presentation, the inclination of the solar module with respect to the support plate is exaggerated in the drawing.

A second solar module SM2 is now inserted in the same manner with a first edge into the upper profile or U of the clamp M2, while the oppositely lying second edge will be born in the lower profile of a third clamp (not illustrated). In a like manner, additional solar modules can be fastened to the solar support plate UL with the aid of additional clamps until the support plate is fully occupied by the solar modules.

Figure 4:
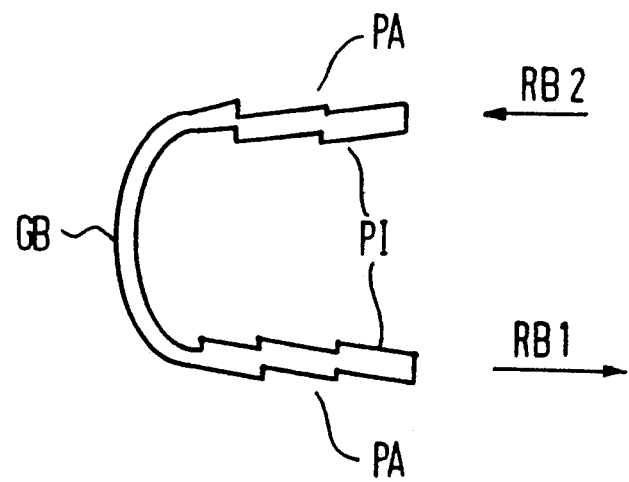
FIG. 4 is an enlarged perspective view of a rubber band or elastic insert utilized with the clamp in accordance with the present invention.

The elastic part, which is executed as a rubber band, as illustrated in FIG. 4, has a U-shaped profile which is especially advantageous for the given purpose of preventing breakage of the panels SM. The elastic part GB represents bent in correspondence with its later position in the clamp M presents, in an especially advantageous manner, different profiles for both the inside and the outside in order to assure a good seating of the solar module SM in the clamp M. The outer profile PA presents, in the direction RB1, slightly rising and then steeply descending steps, with which friction in the clamp facilitates a relative movement in the direction RB2, but aggravates or resists such movement in the direction RB1. Accordingly, a body with the elastic part GB laid about its edge can be slid easily into the clamp M, but can be withdrawn from the clamp only with difficulty.

Although various minor modifications may be suggested by those versed in the art, it should be understood that we wish to embody within the scope of the patent granted hereon all such modifications as reasonably and properly come within the scope of our contribution to the art.

We claim:

1. A clamp for fastening plate-form bodies to a flat support plate, said clamp comprising a base plate having at least one bore for receiving a fastener to fasten the clamp to a flat support plate, a first profile extending from the base plate and having a U shape with a first bight portion connecting a first common shank to the base plate, a second profile being spaced from the base plate by the first profile and having a U shape with a second bight portion connecting a second common shank to the first common shank, and a third profile being spaced from the first profile by the second profile and having a U shape with a third bight portion connecting a third shank portion to the second common shank portion, said shank portions being substantially parallel to the base plate, said first and third profiles opening in one direction and the second profile opening in the opposite direction, said second and third bight portions having substantially the same height so that the distance between the shank portions forming the second and third profiles are substantially the same.

2. The clamp according to claim 1, wherein the bight portion of the first profile has a height less than the bight portions of the second and third profiles.

3. The clamp according to claim 1, which is formed of a bent metal piece.

4. The clamp according to claim 3, wherein the bent metal piece consists of steel.

* * * * *